(12) United States Patent
Gerstenberger et al.

(10) Patent No.: US 6,341,246 B1
(45) Date of Patent: Jan. 22, 2002

(54) OBJECT ORIENTED MOTION SYSTEM

(75) Inventors: Michael D. Gerstenberger, Lake Orion; Scott D. Greig, Rochester; David M. Martin, Clarkston; Khalid Mirza, Rochester Hills, all of MI (US); El-Houssaine Waled, E. Windsor (CA)

(73) Assignee: KUKA Development Laboratories, Inc., Rochester Hills, MI (US)

(*) Notice: Subject to any disclaimer, the term of this patent is extended or adjusted under 35 U.S.C. 154(b) by 0 days.

(21) Appl. No.: 09/277,641

(22) Filed: Mar. 26, 1999

(51) Int. Cl.$^7$ ............................................. G06F 19/00

(52) U.S. Cl. ................ 700/245; 700/246; 700/249; 700/252; 700/259; 700/500.1; 700/260; 700/261; 318/568.1; 318/568.11; 318/568.22; 701/23; 901/15

(58) Field of Search ............................... 700/245, 246, 700/249, 252, 259, 261, 260, 263, 61; 701/23; 706/10, 23, 25, 28; 318/568.11, 568.1, 568.22, 573; 901/15; 600/204; 414/730, 273

(56) References Cited

U.S. PATENT DOCUMENTS

| | | | |
|---|---|---|---|
| 4,990,838 A | * 2/1991 | Kawato et al. | 700/246 |
| 5,055,755 A | * 10/1991 | Ozawa et al. | 318/568.11 |
| 5,063,492 A | * 11/1991 | Yoda et al. | 128/719 |
| 5,136,687 A | * 8/1992 | Edelman et al. | 706/20 |
| 5,337,262 A | * 8/1994 | Luthi et al. | 702/83 |
| 5,539,869 A | * 7/1996 | Spoto et al. | 700/500.1 |
| 5,673,367 A | * 9/1997 | Buckley | 706/23 |
| 5,887,121 A | * 3/1999 | Funda et al. | 700/263 |
| 5,996,076 A | * 11/1999 | Rowney et al. | 713/201 |

OTHER PUBLICATIONS

Song et al., KARES: Intelligent Rehavilitation Robotic System for the Disabled and the Elderly, IEEE., pp. 2682–2685, 1998.*
Pino et al., A More Efficient Man/Machine Interface: Fusion of the Interacting Telethesis and Smart Wheelchair Projects, IEEE., pp. 41–45, 1998.*
Cooperstock et al., An Efficiently Trainable Neural Network Based Vision–Guided Robot Arm, IEEE., pp. 738–743, 1993.*
Kozakiewicz et al., Calibration Analysis of a Direct Drive Robot, IEEE., pp. 213–220, 1990.*
Duleba et al., Symbolic Computation–Based Synthesis of Neural Network Dynamics and Controller for Robots, IEEE., pp. 1–6, 1990.*
Kuhn et al., Neural Approach to Visual Servoing for Robotic Hand Eye Coordination, IEEE., pp. 1–6, 1995.*
Wedeward et al., Adaptive Controllers that Employ Saturated Error Update Laws for Robot Trajectory Tracking, IEEE., pp. 45–50, 1995.*
Colbaugh et al., Application of Adaptive Tracking Control to Industrial Robots, IEEE., pp. 9*15–920, 1994.*
Iiu et al., A New VLSI Architecture For Real–Time Control Of Robot Manipulators, IEEE., pp. 1828–1835, 1991.*

\* cited by examiner

Primary Examiner—William A. Cuchlinski, Jr.
Assistant Examiner—McDieunel Marc
(74) Attorney, Agent, or Firm—Harness, Dickey & Pierce, P.L.C.

(57) ABSTRACT

An object oriented motion system for controlling the movement of a robotic manipulator is presented. The motion system includes a trajectory generator object for producing a stream of machine joint commands. A kinematics object is operable to provide a set of robotic arm specific functions for the trajectory generator object. A servo object provides an interface to the servo system. The stream of machine motor commands are converted by the servo object to a stream of signals that drive the servo system, thereby controlling the trajectory of the robot arm.

11 Claims, 3 Drawing Sheets

OBJECT ORIENTED MOTION SYSTEM

BACKGROUND AND SUMMARY OF THE INVENTION

The present invention relates generally to robotic manipulator systems. More particularly, the invention relates to a motion system architecture for controlling the movements of a robotic manipulator.

With the increasing importance of automation in manufacturing all types of articles, the demand for robotic systems has escalated. In response to the increased demand for robotic systems, multiple manufacturers have introduced a wide variety of robotic systems for various applications. An equally wide variety of kinematics configurations for the robots have been devised as manufacturers seek to optimize their robots for particular markets.

To control the movements of a robotic system a motion system is included in an associated computer system. The motion system for a particular robotic system must be tailored to that robot's particular kinematics configuration. Different link lengths and joint configurations require the controlling equations to be adapted to those parametric differences. When there were only a small number of different types of robotic systems, the task of maintaining unique motion systems for each type of robotic system was not overly complex. However, as the variety of robotic systems has increased, the complexity of maintaining unique motion systems has also increased. Modifications and upgrades to existing robotic systems further increased the burden on maintaining motion systems.

Initially, unique motion systems were designed for each type of robotic system. Then, motion system architectures were changed so that unique kinematics configuration libraries were maintained for each of the different types and versions of robotic systems. An inherent disadvantage of separate kinematics configuration libraries is that changes made in the kinematics interface would often entail modifications to each of the configuration libraries. Maintaining separate kinematics configuration libraries eventually became overly cumbersome as the number of libraries increased to keep up with increasing number of robotic systems. Motion systems were then modified to incorporate all of the unique kinematics configuration libraries within the main motion system file. This new arrangement still suffers from the disadvantage of code duplication within the main program for high level kinematics functions. When the motion program is revised, the code duplication of the kinematics functions necessitates that the modifications resulting from the revision must be implemented in each of the kinematics program modules. Modifying and maintaining each of the kinematics modules is a time consuming and risky venture. An incorrect modification of any of the kinematics modules can result in improper operation of the motion system. Similar problems occurred with the servo interface.

In view of the above, it is a primary object of the present invention to provide a motion system that minimizes the duplication of common functions.

Additionally, it is an object of the present invention to provide a motion system that encapsulates common functions into groupings that are related to physical characteristics of the controlled robotic system.

The present invention provides an object oriented motion system for controlling the movement of a robotic manipulator that is driven by a servo system. The motion system includes a trajectory generator object for producing a stream of machine joint commands. A kinematics object is operable to provide a set of robotic arm specific functions for the trajectory generator object. A servo object provides an interface to the servo system. The stream of machine joint commands are converted by the servo object to a stream of hardware specific commands that drive the servo system, thereby controlling the trajectory of the robot arm.

For a more complete understanding of the invention, its objectives and advantages, refer to the following specification and to the accompanying drawings.

DESCRIPTION OF THE PREFERRED EMBODIMENT

Figure 1:
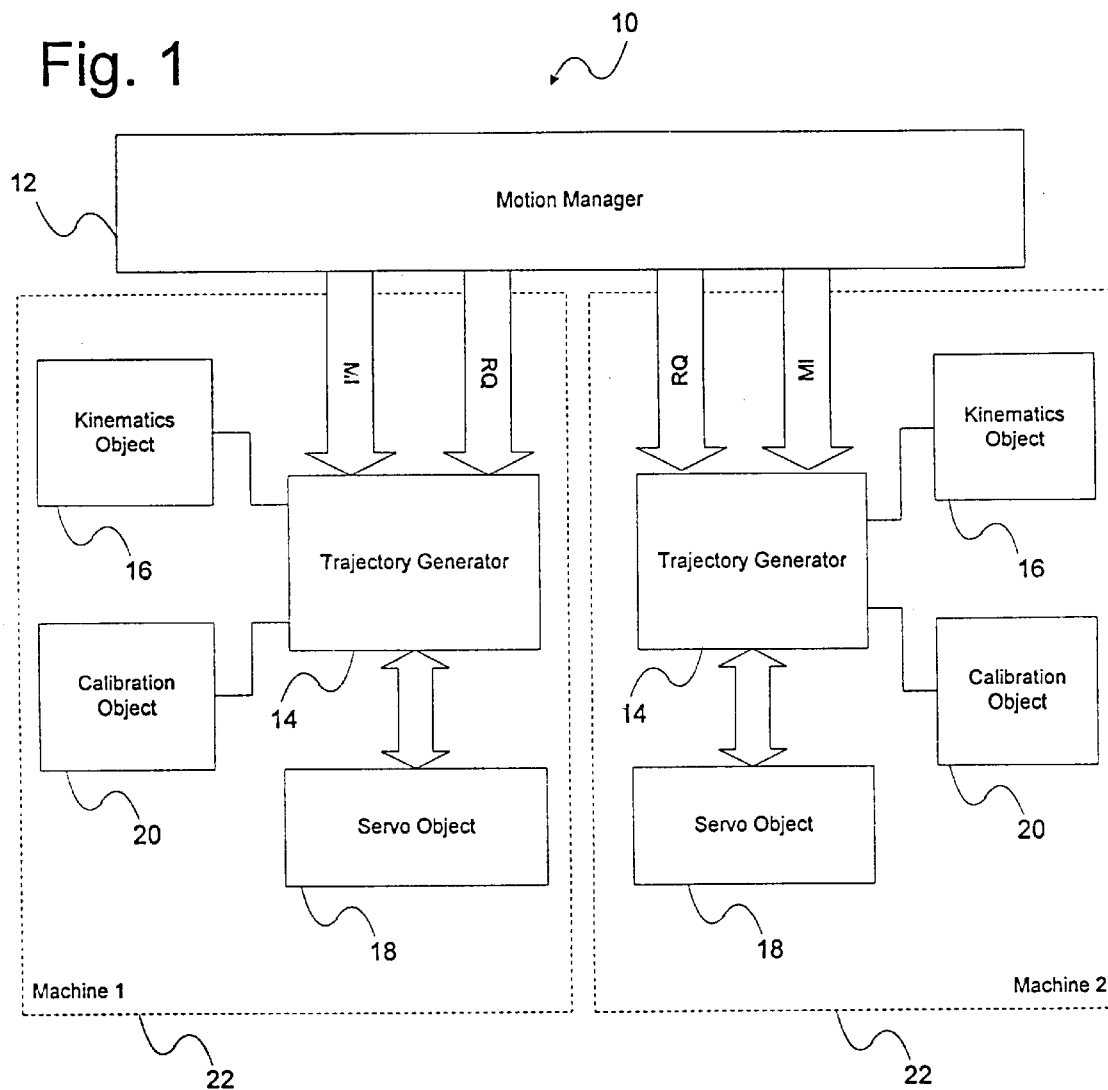
FIG. 1 is a block diagram of a motion system architecture in accordance with the teachings of the invention.

Referring to FIG. 1, a presently preferred motion system 10 is illustrated. The following description of the motion system 10 is separated into three sections. The first section deals with the use of Object-Oriented Design at a component level to implement an open motion controller. The second section then focuses specifically on the component responsible for trajectory generation, and the use of Object-Oriented Programming to abstract all motion-dependent functionality. Lastly, the threads of the trajectory generator are discussed, with the major responsibilities for each.

Open Motion Controller Using Object-Oriented Design

Referring to FIG. 1, the motion system 10 is designed for modularity and compartmentalization. As illustrated, multiple machines 22 can be simultaneously controlled by the motion system 10. The software components used by the motion system are implemented using an Object Oriented approach. Services provided by kinematics, servo, and calibration libraries are encapsulated as discrete objects for each machine. These objects contain both the functional implementation as well as internal data structures needed for the component to operate properly. As a result of the Object Oriented Design, motion system components can be easily extended or replaced to support a variety of machines.

The presently preferred motion system 10 comprises five discrete components: a Motion Manager 12, a Trajectory Generator 14, a Kinematics Object 16, a Servo Object 18, and a Calibration Object 20. Although the presently preferred embodiment of the invention includes five components, it is within the scope of the invention to include only a Trajectory Generator 14, a Kinematics Object 16, and a Servo Object 18. Such a system would still allow for control of machines with any kinematic relationship, and with any servo system.

Motion system 10 includes one Motion Manager 12, regardless of the number of machines 22 under its control. The Motion Manager 12 is primarily responsible for controlling application logins, monitoring the status of all current motion system clients, and distributing incoming messages to the appropriate Trajectory Generators 14. In addition, the Motion Manager 12 handles the start-up and shutdown procedures for the motion system 10.

For each machine 22 a separate Trajectory Generator 14 is created. While executing a particular motion, the trajectory generator 14 produces a stream of machine joint commands indexed to evenly spaced time increments. The nominal joint command stream varies based on the type of motion requested, the speed and acceleration requested, neighboring motion requests, reference frame and tool definitions, the machine kinematics, machine constraints, and the time increment. Asynchronous commands can modify the nominal joint command stream by changing speed, adjusting frames of reference, adjusting tool definitions, and canceling motion requests. It is important to note that the design and implementation of the Trajectory Generator 14 is completely independent of the particular machine 22 under control.

For each Trajectory Generator 14, three supporting objects are defined: the Kinematics Object 16, the Servo Object 18, and the Calibration Object 20. The Kinematics Object 16 handles all machine specific functions, including forward and inverse kinematics, forward and inverse velocity conversions (using full Jacobians), and joint/motor space conversions. The Calibration Object 20 handles machine calibration, which may or may not be required based on the specific type of motor feedback devices being used (absolute feedback systems do not require calibration). Lastly, the Servo Object 18 serves as the interface to the servo hardware, and is implemented to support a particular servo system.

Since these components are designed and implemented using Object Oriented Programming, each has a well defined functional interface. As a result, components can be easily extended, modified, or replaced to support machines with different kinematic models, calibration techniques, and servo systems. Since the motion system 10 is highly customizable, it is considered an 'open' motion system.

Trajectory Generation Using Object-Oriented Design

The current Trajectory Generator 14 also relies heavily on Object Oriented Design and Programming. Although the motion of a machine 22 is highly dependent on the requested motion and transition type, it is preferable for the behavior of the Trajectory Generator 14 to be constant and therefore independent of the specifics of the motion being requested. For this reason, all motion-specific functions and data structures are abstracted into a Motion Class.

The use of Object-Oriented Programming in the Trajectory Generator 14 provides several distinct improvements over other systems. By implementing all motion-specific functions in a Motion Class 26, the Trajectory Generator 14 can be designed without consideration for the particular needs of the motions supported. In addition, by encapsulating functionality into objects, the requirements and interface for each object become very well-defined. This improves code maintainability and flow. As new features are added to the motion system 10, new objects can be easily defined using the existing functional interfaces. Lastly, Object-Oriented Design allows for easy conceptualization of the motion system 10 and trajectory generation at very high levels of understanding.

Figure 2:
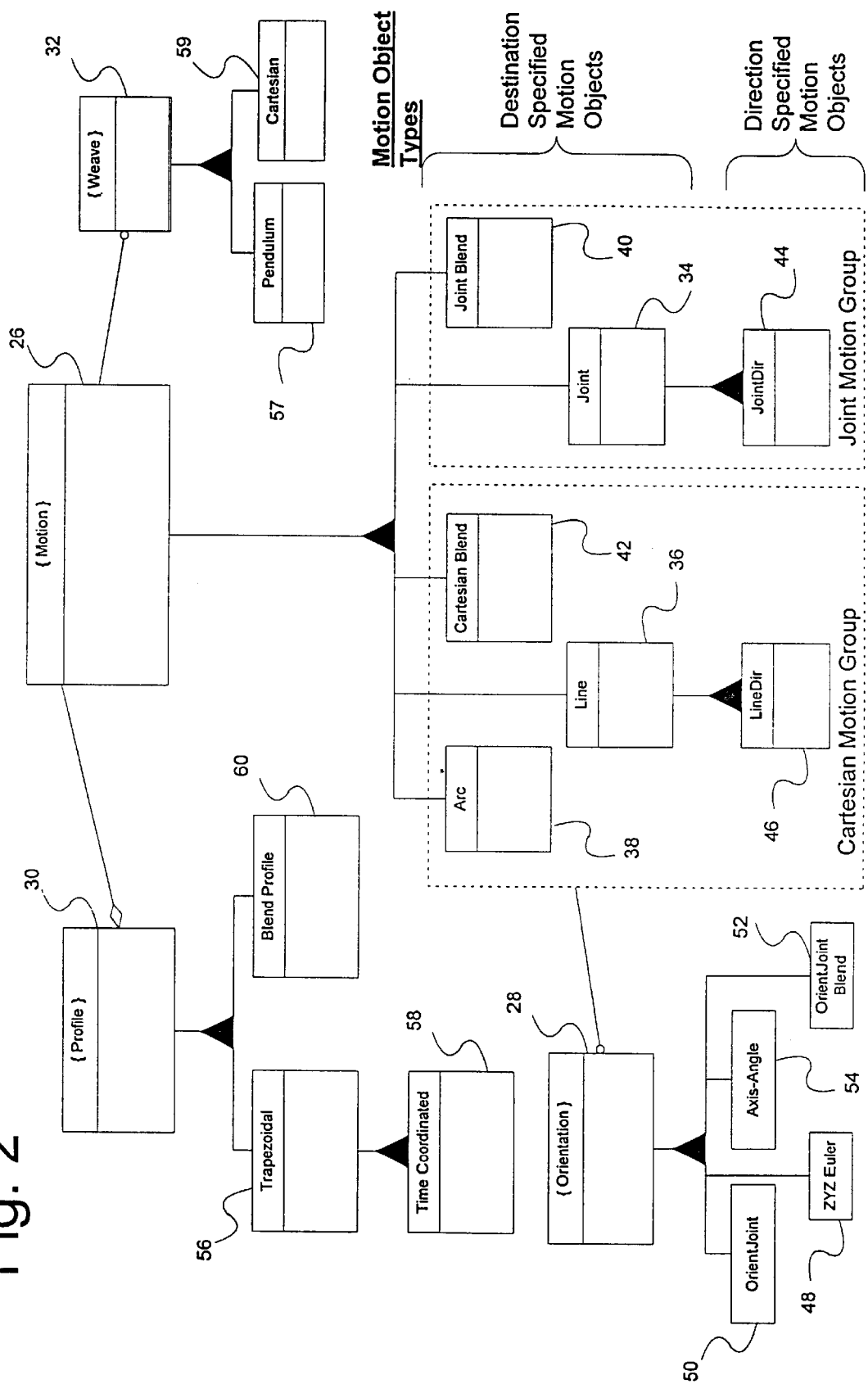
FIG. 2 is a diagram illustrating a motion class of the presently preferred embodiment.

Referring to FIG. 2, an object diagram depicting objects of the major classes employed in the presently preferred motion system 10 is illustrated. All motion requests result in the instantiation of a Motion Object 26. The Motion Object 26 includes all of the motion-specific functions, data, and algorithms necessary for smooth trajectory control. While the Motion Object 26 serves as the main interface to the threads of the Trajectory Generator 14, other objects—particularly an Orientation Object 28, Profile Object 30, and Weave Object 32—may be instantiated by the Motion Object 26 for additional support. Although four major classes (Motion, Orientation, Profile, and Weave) are currently used by the presently preferred motion system 10, it is within the scope of the invention to implement the Trajectory Generator 14 with only the Motion Class and the Profile Class. In addition, the number and type of derived classes needed depends on the features being supported by the motion controller, and may vary depending on implementation.

The threads of the Trajectory Generator 14 are designed to be motion-type independent. Therefore, the Trajectory Generator 14 relies on the Motion Object 26 for implementation of all motion-specific algorithms, such as computing distance and path interpolation. Currently, two types of Motion Objects 26 are supported: destination specified and direction specified.

In the case of destination specified motions, a Motion Instruction message includes the machine position at the motion end point, specified in either a joint or Cartesian representation. These Motion Objects 26 include: Joint 34, Line 36, Arc 38, Joint Blend (B-Spline) 40, and Cartesian Blend (B-Spline) 42.

For direction specified motions, no end point is given. Rather a direction vector is specified, and the machine 22 is moved in the direction specified until a machine limit is reached, or a Cancel request is received. This is particularly useful for machine jogging. Direction-specified motions are supported in both joint space and Cartesian space using the following Object definitions: JointDir 44, LineDir 46.

In the cases of Cartesian motions such as Line 36, Arc 38, Cartesian Blend 42, and LineDir 46 Objects, a separate object must be created to handle orientation control. Like the Motion Class, the Orientation Class includes all orientation specific data, functions, and algorithms necessary for smooth trajectory control. Current Orientation Objects 28 include: ZYZ Euler 48, OrientJoint 50, OrientJoint Blend (B-Spline) 52, and Axis/Angle 54.

For all Motion Objects 26, a Profile Object 30 is created. The Profile Object 30 is responsible for computing the speed profile which satisfies user requested constraints for maximum speed, acceleration, and deceleration. For a given interpolation time, the Profile Object 30 determines the current distance, speed, and acceleration of the machine along the path. Currently, three types are supported: Trapezoidal Profile 56, Time-Coordinated Profile 58, and Blend Profile 60.

For superposing a waveform on the nominal robot path a Weave Object 32 is created. The Weave Object 32 is responsible for computing the changes to the current distance, speed, and acceleration that are required to superpose the desired waveform perpendicular to the robot path. Currently, two types are supported: Pendulum Weave 57 and Cartesian Weave 59.

Trajectory Generator Thread Architecture

The previous sections focused on relatively high-level design architectures used in the presently preferred motion system 10. In this section, however, the focus is on the internal details of the Trajectory Generator 14, which communicates with the servo object 18, and the major responsibilities of each of its threads.

While the motion system 10 runs as a single process, the module itself contains multiple threads. Each thread within the motion system 10 runs independently of the other threads, but may share information with those threads. In instances where two or more threads access the same data structures or variables, mutual exclusion services of the operating system 10 ensure controlled access to the data.

Figure 3:
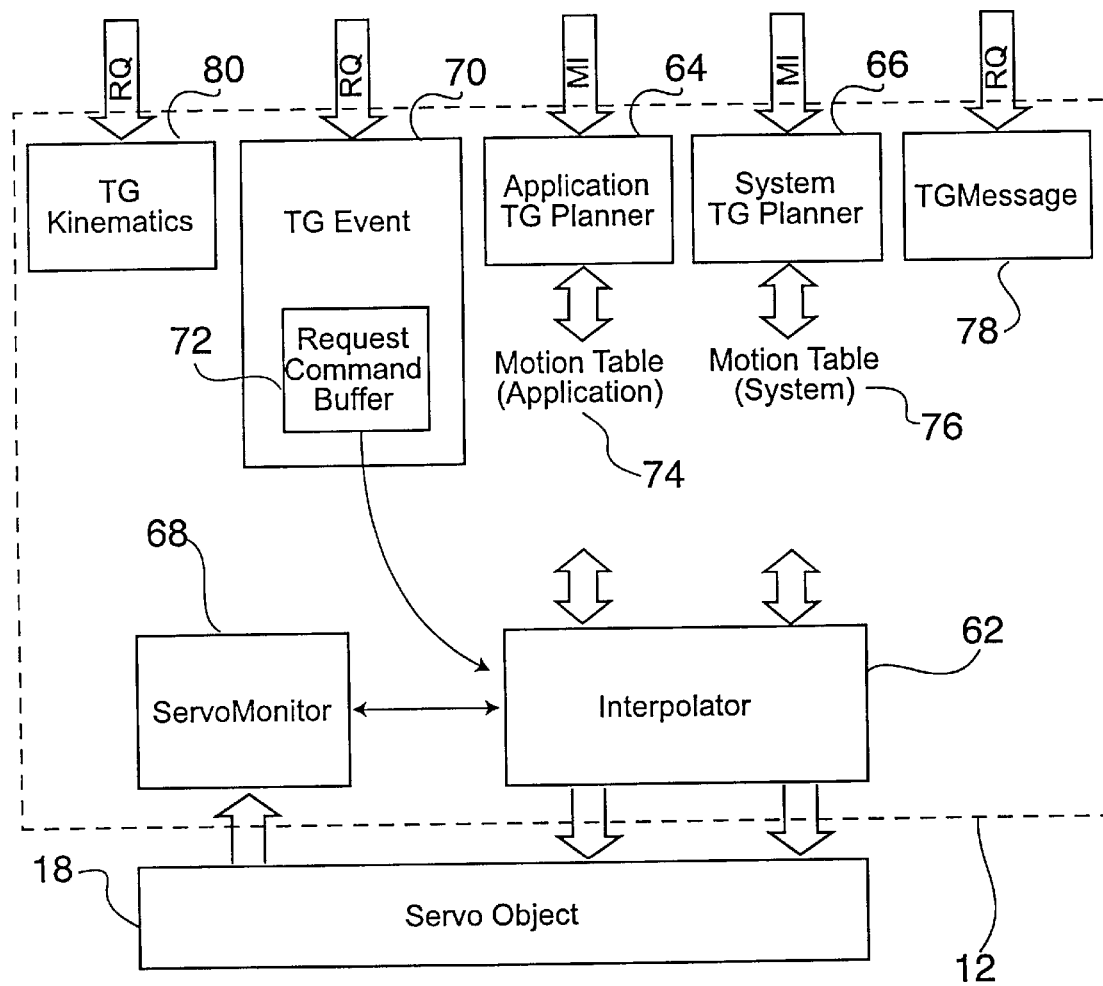
FIG. 3 is a block diagram of a Trajectory Generator Thread Architecture employed in the presently preferred embodiment.

With reference to FIG. 3, the architecture for the Trajectory Generator 14, including threads and data flow, for a motion system 10 (FIG. 1) controlling a single machine 22 (FIG. 1) is illustrated. The Trajectory Generator 14 is designed using a Planner/Interpolator architecture. During the 'planning' phase, motion requests are preprocessed in a non-real-time environment so that motion parameters, including insertion of blend segments, can be determined prior to motion execution. This preprocessing allows the Trajectory Generator 14 to employ look-ahead algorithms to generate smooth paths capable of reaching optimal speeds. Once motion requests are planned, the motion 'interpolation' phase is executed. Interpolation runs in a hard real-time environment, and generates position and velocity commands to the servo object. The presently preferred motion system 10 employs a single Interpolator 62 and two Planners, an Application TG Planner 64 and a System TG Planner 66. This structure has the advantage of being able to handle motion requests at two different priority levels. With this structure motion, requests received by user programs can be suspended while motion requests from a Teach Pendant or other preempting motion source are serviced immediately. Once the Teach Pendant is de-activated, motion control returns to user programs, which can continue normally.

A ServoMonitor module 68 is primarily responsible for monitoring safety systems supported by the servo object interface. Running as a separate thread, ServoMonitor 68 detects hardware errors such as drive faults and encoder integrity problems, as well as motion control errors such as excessive following error. Status information is then made available to the trajectory generator and application modules.

The TG Planner threads 64 and 66 are responsible for handling Motion Instruction (MI) messages for the trajectory generator 14. Each planner 64 and 66 handles motion requests from clients running at one of the two priority levels. The Application TG Planner 64 only processes MI messages that are received from motion system clients attached at the APPLICATION priority, such as most user programs. The System TG Planner 66 only processes MI messages that are received from motion system clients attached at the SYSTEM priority, such as teach pendants and other manual motion devices.

The TG Planners 64 and 66 run asynchronously and therefore must have a thread priority lower than the Interpolator 62 and ServoMonitor 68. If no incoming MI messages are available in the MI queue, the associated TG Planner, 64 and 66, does not run. However, if an MI message is available, the TG Planner, 64 and 66, parses the message and takes action depending on its type.

The TGEvent thread 70 is activated when a Request (RQ) message becomes available in the incoming queue. Request messages are forwarded from the Motion Manager 12 and represent asynchronous instructions such as Hold, Cancel, and DeltaFrame. TGEvent 70 is responsible for translating the message and taking appropriate action.

In some cases, asynchronous events cannot be processed directly by TG Event 70. For instance, any requests which alter motion execution, such as Hold, Cancel, and DeltaFrame, must be controlled by a thread from the TG Interpolator 62. Hence, an internal mechanism is needed to communicate trajectory modification requests to the other components of the trajectory generator 14. This is accomplished using an Asynchronous Request Command Buffer 72. It is important to note that the information contained within the Command Buffer 72 does not necessarily represent the current state of the trajectory generator 14. Rather, this information is used to control the command stream as changes in state are requested.

The Interpolator 62 divides any motion requests into joint space commands at regular time intervals. The thread runs synchronously and, as such, must be at a higher priority than the Planners 64 and 66. However, because the functionality may change as a result of servo related status information, the ServoMonitor 68 thread must complete before the Interpolator 62 is allowed to run.

All motion interpolation and trajectory modifications are handled in the Interpolator 62. The Request Command Buffer 72 is routinely checked for status. As a result of these modification requests, the execution of the Interpolator 62 may change. Note that the Interpolator 62 functionality also changes depending on the status of Motion Tables 74 and 76. If the Motion Tables 74 and 76 are empty, the Interpolator 62 still runs, but does not generate any new servo commands. Consequently, the servo object is responsible for maintaining the last servo command when no further commands are sent.

A TG Message thread 78 handles most outgoing TG messages. However, information requests are handled directly by the thread receiving the request. Where applicable, messages are sent back to requesting applications, and all error messages are posted to a System Event Logger (not shown).

Requests for kinematics are handled through the TG Kinematics server 80. The thread is activated when an RQ message becomes available in the incoming queue. These messages have been forwarded from the Motion manager 12 (FIG. 1) and represent requests to the kinematics object, such as forward and inverse kinematics, and joint limit checking. The kinematics server 80 is responsible for translating the message and taking appropriate action.

While the invention has been described in its presently preferred embodiment, it will be understood that the invention is capable of modification or adaptation without departing from the spirit of the invention as set forth in the appended claims.

We claim:

1. A motion system for controlling the movement of a robot arm through a servo system, comprising:
   an object oriented motion system implemented as a plurality of software objects each encapsulating both functional implementation code and associated internal data structures:
   wherein said plurality of software objects include the following software objects:
      a trajectory generator object for producing a stream of machine motor commands;
      a kinematics object operable to provide as et of robot arm specific functions for said trajectory generator objects; and
      as servo object for interfacing to the servo system, such that the stream of machine motor commands are converted to a stream of signals to operate the robot arm.

2. The motion system of claim 1 further comprising a calibration object activable to calibrate the robot arm.

3. The motion system of claim 1 further comprising a motion manager for controlling application logins and distributing incoming messages to the trajectory generator object.

4. The motion system of claim 1 wherein the kinematics object set of functions are selected from the group of: forward and inverse kinematics, forward and inverse velocity calculations using full Jacobians, motor/joint space conversions, and setting/retrieving machine specific data.

5. A computer-implemented system for a trajectory generator operable to plan a trajectory for a robotic arm, comprising:

a motion object create in response to a motion request, said motion object activable to implement motion specific functions and motion specific data structures for said trajectory generator;

said motion object being operative to create a profile object for computing a speed profile for the trajectory that satisfies user requested constraints; and a weave object for controlling the superposition of a predefined waveform upon the trajectory.

6. The system of claim 5 wherein the motion object hierarchically defines motion as a set of sub-objects operable to implement said motion specific functions and data structures.

7. The system of claim 5 further comprising a Cartesian motion object for controlling a translational motion of the trajectory.

8. The system of claim 7 wherein the Cartesian motion includes an orientation and the system further comprises an orientation object for controlling the orientation of the Catesian motion.

9. The system of claim 5 further comprising a joint motion object for controlling a joint motion of the trajectory.

10. The system of claim 7 wherein the Cartesian object further includes a Cartesian motion group object selected from the group of: Arc, Cartesian Blend, Line, and LineDir.

11. The system of claim 9 wherein the joint object further includes a joint motion group object selected from the group of: Joint, Joint Blend, and JointDir.

* * * * *

UNITED STATES PATENT AND TRADEMARK OFFICE
CERTIFICATE OF CORRECTION

PATENT NO.   : 6,341,246 B1
DATED        : January 22, 2002
INVENTOR(S)  : Michael D. Gerstenberger et al.

It is certified that error appears in the above-identified patent and that said Letters Patent is hereby corrected as shown below:

Column 6,
Line 47, "as et" should be -- a set --.

Column 8,
Line 4, "Catesian" should be -- Cartesian --

Signed and Sealed this

Thirty-first Day of December, 2002

JAMES E. ROGAN
*Director of the United States Patent and Trademark Office*